United States Patent
Bogdan

[19]

[11] Patent Number: 6,069,457
[45] Date of Patent: May 30, 2000

[54] METHOD AND APPARATUS FOR CONTROLLING LIGHTS AND OTHER DEVICES

[75] Inventor: Alexei Bogdan, Bolton, Canada

[73] Assignee: Lumion University

[21] Appl. No.: 09/009,376

[22] Filed: Jan. 20, 1998

[51] Int. Cl.[7] .................................................. G05F 1/00
[52] U.S. Cl. .......................... 315/291; 315/314; 315/308; 315/265; 315/360; 315/DIG. 4
[58] Field of Search ..................... 315/291, 308, 315/307, 314, 265, 253, 339, 360, 362, DIG. 4; 323/211, 221; 307/140; 340/310.01, 310.04

[56] References Cited

U.S. PATENT DOCUMENTS

| | | | |
|---|---|---|---|
| 3,935,505 | 1/1976 | Spiteri ..................................... | 315/194 |
| 4,181,873 | 1/1980 | Nuver ...................................... | 315/291 |
| 4,197,485 | 4/1980 | Nuver ...................................... | 315/291 |
| 4,478,468 | 10/1984 | Schoen et al. .......................... | 315/291 |
| 4,859,914 | 8/1989 | Summa ................................... | 315/354 |
| 5,055,746 | 10/1991 | Hu et al. ................................. | 315/291 |
| 5,323,088 | 6/1994 | Cunningham .......................... | 315/195 |
| 5,394,064 | 2/1995 | Ranganath et al. ..................... | 315/209 |
| 5,396,155 | 3/1995 | Bezdon et al. .......................... | 315/291 |
| 5,515,261 | 5/1996 | Bogdan .................................... | 363/89 |
| 5,614,811 | 3/1997 | Sagalovich et al. .................... | 323/207 |

*Primary Examiner*—Hoanganh Le
*Assistant Examiner*—Haissa Philogene
*Attorney, Agent, or Firm*—Bereskin & Parr; Richard J. Parr

[57] ABSTRACT

A dimmer for dimming gas discharge and incandescent lamps can be installed in place of a standard wall-mounted light switch and connected to existing wiring. The dimmer has a switch coupling one or more full wave bridge rectifiers to a main AC source and to existing power wires running through the wall to the fixture. The bridge rectifiers are controlled by the dimming switch such that either the normal AC source waveform is transmitted over the power wires, or a full wave positively or negatively rectified AC waveform is transmitted, or else no voltage is transmitted. At the fixture, the transmitted power waveform is applied to the lamp power terminal of the lamp or ballast as well as to a decoder. A dimming interface receives the decoder output and appropriately adjusts lamp brightness by changing the operating conditions of the lamp in accordance with this output. The dimmer may also be used to control general household devices containing a front-end full wave bridge rectifier.

26 Claims, 10 Drawing Sheets

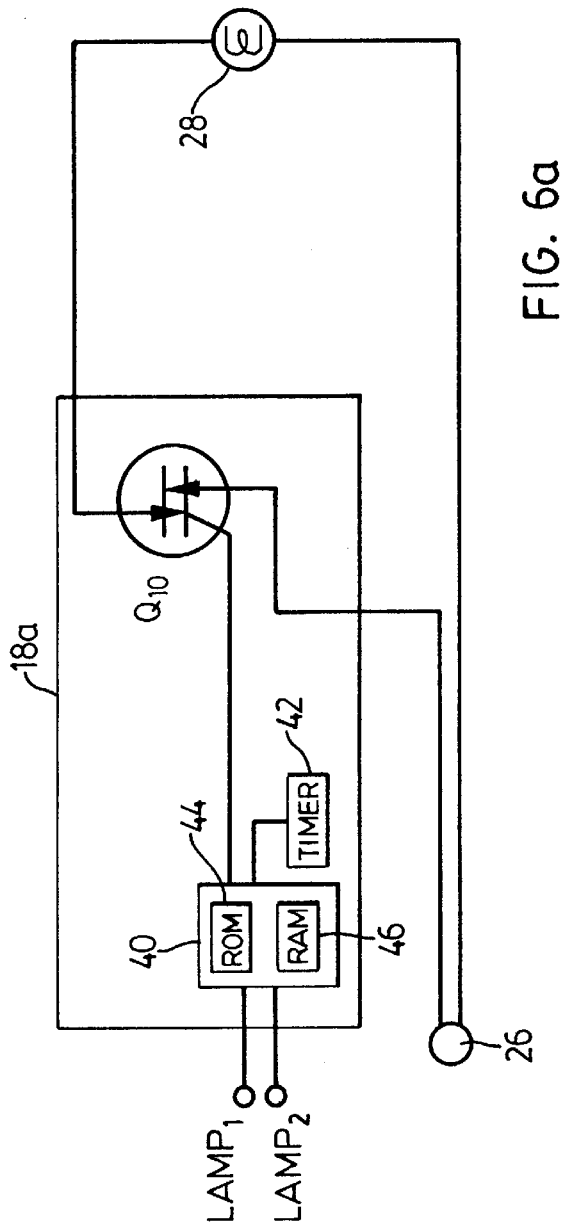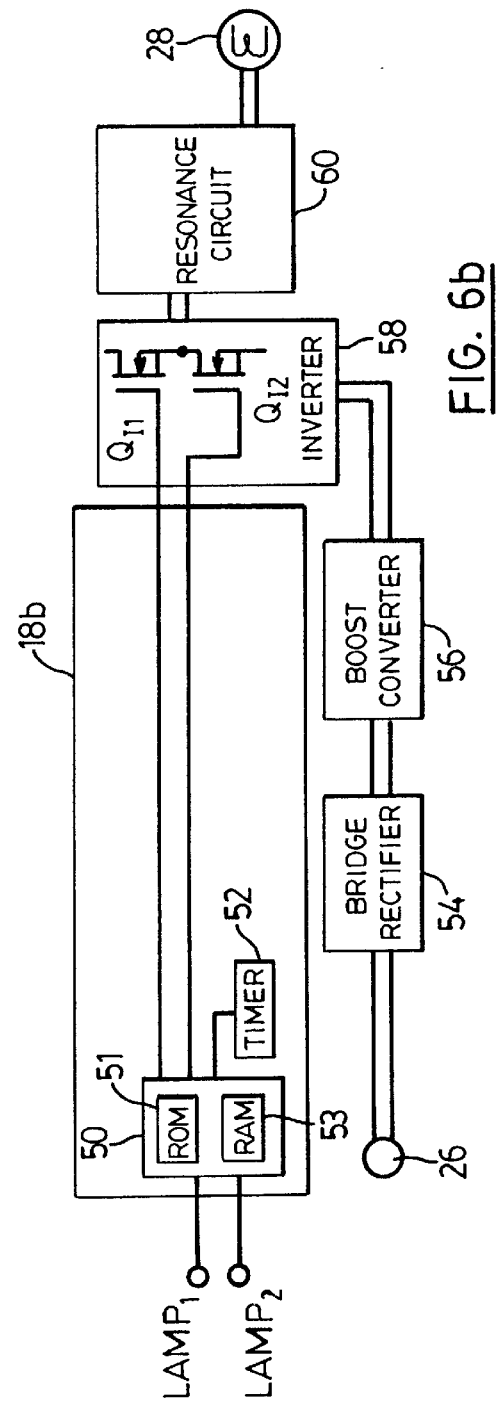

METHOD AND APPARATUS FOR CONTROLLING LIGHTS AND OTHER DEVICES

FIELD OF THE INVENTION

The present invention relates generally to device control circuitry. In a particular embodiment it relates to a dimmer for use with gas discharge lamp ballasts and incandescent lamps.

BACKGROUND OF THE INVENTION

Dimming circuits for incandescent lamps are well-known and extensively used. However, there are fewer commercially available dimming circuits suitable for use with gas discharge lamps, such as fluorescent lamps. Available gas-discharge lamp dimming circuits contain complex circuitry and a high number of components which makes them expensive to build, install and retrofit to existing ballasts. Consequently, most residential and commercial fluorescent installations do not have dimming capability.

Dimming of fluorescent and other gas discharge lamps is commonly accomplished by a dimming circuit located in the ballast and controlled using the well known "0 to 10V" signalling protocol. This protocol uses a pair of dedicated wires to send a dimming control signal represented by a voltage signal of value between 0 and 10 volts to the ballast dimming circuitry. The ballast dimming circuitry then converts this control signal into a signal adapted to change ballast operating conditions. While this dimming method is popular for dimming fluorescent and other gas discharge lamps, it suffers from several significant disadvantages.

In order to provide dimming for existing lighting installations, the dedicated wires of this signalling system must be installed within ceilings and walls, resulting in significant installation costs. Further, since each ballast requires a separate set of wires, the lighting system is complex to wire and can pose a safety threat if any of the wires are improperly installed (i.e., if the dimming signal wires are mistakenly connected to the main power source, the ballast will short, severely damaging the device and possibly injuring the installer).

Further, signal wires from one ballast must be galvanically isolated from possible interference and noise produced by other ballast signal wires. Such isolation may require the use of additional components which significantly adds to the expense and complexity of a lighting system comprising a number of ballasts. Moreover, since the main power wires are often in close proximity to the signal wires, control signals are still often affected by electrical interference and noise. Corrupted control signals consequently can cause device malfunctions.

A dimming protocol which offers independent fixture addressing is a digital protocol method developed by Tridonic Corporation. This protocol uses signal wires to transmit digital information representing the desired brightness level (i.e., 128 or 256 levels of brightness) and other information such as the particular address of the target ballast to be dimmed. While this method allows for increased unit flexibility and better signal wire economy, the system still requires the use of complex decoders within each ballast and stand alone dimming ballasts which are typically twice as expensive as the existing 0–10 Volt protocol dimming ballasts. In addition, the digital signal sent to the ballasts is susceptible to electrical noise and interference.

Another dimming signalling system is shown in U.S. Pat. No. 4,181,873 to Nuver. U.S. Pat. No. 4,181,873 avoids the need for a separate set of signal leads to a lamp ballast by encoding a high frequency signal (200 KHz to 400 Hz) on an AC line voltage. This signal provides control information which is used to control the gating to a triac for dimming a lamp. However, this dimming protocol is rarely used because such RF communications are very sensitive to the electrical noise commonly found on an AC line. Further, this signalling protocol generates what is known as "RF pollution" which affects radio frequency transmissions and which violates FCC Regulations regarding the maximum level of radio frequency interference that any industrial or commercial electrical device may produce.

Finally, a power line control system is disclosed in U.S. Pat. No. 5,614,811 to Sagalovich. U.S. Pat. No. 5,614,811 discloses encoding voltage pulses within an AC power line voltage at zero crossing points of any one-half AC cycle. The voltage pulses act as control signals for any electrical device which is connected to the AC power line through a receiver/control apparatus. While this control system alleviates some disadvantages associated with RF pollution, the system utilizes relatively complex transmitter and receiver circuits and still creates some RF pollution.

Thus, there is a need for a dimmer circuit for gas discharge lamp ballasts and incandescent or halogen lamps, which can be implemented in a cost-effective manner and which facilitates easy and safe installation, and which is not susceptible to electrical interference or corruption, and which meets established FCC radio interference noise regulations and which can be easily retrofitted to operate within non-dimming ballasts.

BRIEF SUMMARY OF THE INVENTION

It is therefore an object of the present invention to provide a control circuit for controlling an electrical load having a load input, said control circuit comprising:

(a) a power input for receiving an input AC waveform having a selected RMS value.

(b) a rectifying circuit coupled to said input for producing at a power output one of a plurality of output waveforms from said AC input waveform, each output waveform having an RMS value substantially the same as said selected RMS value, (c) a controller coupled to said rectifying circuit and operative to cause said rectifying circuit to produce at said power output a selected one of said output waveforms, (d) said load input being adapted to be coupled to said power output for receiving said selected output waveform so that said selected output waveform provides power to said load, (e) and a decoder control circuit adapted to be coupled to said power output and to said load and responsive to the selected output from said rectifying circuit for controlling said load.

In a second aspect, the present invention provides a method for controlling an electrical load at a first location connected by power wires to an AC source at a second location, said AC source providing an AC waveform having a selected RMS value, said method comprising:

(a) controlling said AC waveform at said second location to produce a set of power waveforms each having an RMS value substantially equal to said selected RMS value, (b) selectively transmitting one of said set of power waveforms from said second location over said power lines to said electrical load to provide power to said load, (c) at said first location, decoding said power waveforms and controlling said electrical device in accordance therewith.

Further objects and advantages of the invention will appear from the following description, taken together with the accompanying drawings.

BRIEF DESCRIPTION OF THE DRAWINGS

In the accompanying drawings:

FIG. 6a shows a typical load control for use with a typical incandescent lamp;

FIG. 6b shows a typical load control for use with a typical gas discharge lamp ballast;

DETAILED DESCRIPTION OF PREFERRED EMBODIMENTS

Figure 1:
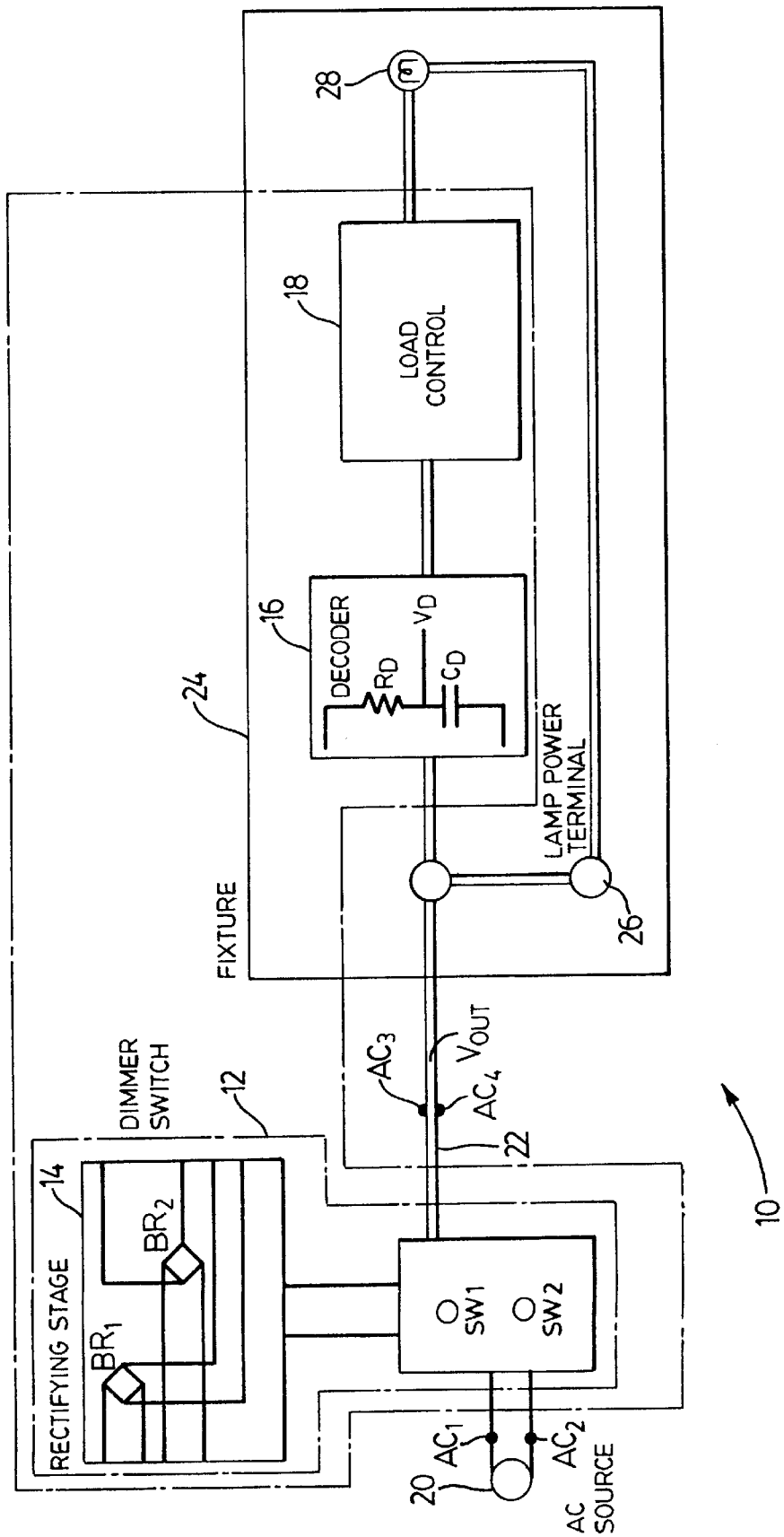
FIG. 1 is a block diagram view of a lamp with a universal dimmer connected thereto, according to the present invention.

Reference is first made to FIG. 1, which shows a universal dimmer 10 according to a preferred embodiment of the invention. Dimmer 10 includes a dimmer switch 12, a rectifying stage 14, a decoder 16 and a load control 18.

Dimmer switch 12 has input terminals $AC_1$, and $AC_2$ connected to an AC source 20, typically a 60 Hz power line from a distribution panel, and is typically mounted in a conventional wall switch box. Dimmer switch 12 is designed to replace a standard wall-mounted light switch and is attached to existing wiring. Dimmer switch 12 includes manual or electronic switches $SW_1$ and $SW_2$ which together can form four different switch configurations. Dimmer switch 12 has output terminals $AC_3$, $AC_4$ connected through existing power wires 22 to decoder 16 located in a lighting fixture 24.

Rectifying stage 14 is connected to (and forms part of) dimmer switch 12 and is typically contained in a box-like housing on the back side of dimmer switch 12. Rectifying stage 14 includes two full wave bridge rectifiers $BR_1$ and $BR_2$. Various configurations of switches $SW_1$ and $SW_2$ result in the connection of the inputs of neither, one, or both of bridge rectifiers $BR_1$ and $BR_2$ to AC source 20. Various configurations of switches $SW_1$ and $SW_2$ also result in the connection of the outputs of neither, one or both bridge rectifiers $BR_1$ and $BR_2$ to power wires 22.

When the inputs of bridge rectifier $BR_1$ (or $BR_2$) are connected to AC source 20 and the outputs of bridge rectifier $BR_1$ (or $BR_2$) are connected to power wires 22, bridge rectifier $BR_1$ (or $BR_2$) becomes active and produces a full wave rectified AC signal on its output. Bridge rectifier $BR_1$ is configured within rectifying stage 14 such that when bridge rectifier $BR_1$ is active, it will conduct and provide a full wave negatively rectified AC signal at terminals $AC_3$, $AC_4$ to decoder 16. Similarly, an active bridge rectifier $BR_2$ will provide a full wave positively rectified AC signal to decoder 16.

When both bridge rectifiers $BR_1$ and $BR_2$ are inactive, an AC signal from AC source 20 is transmitted directly through dimmer switch 12 via terminals $AC_3$, $AC_4$ to power wires 22, as will be explained. When bridge rectifiers $BR_1$ and $BR_2$ are both active, a zero voltage signal is output to decoder 16, as will also be explained. In this way, four different power waveforms may be produced by rectifying stage 14 for output at terminals $AC_3$, $AC_4$ to decoder 16 in accordance with the four different possible configurations of switches $SW_1$ and $SW_2$.

Decoder 16 is installed within fixture 24 and is connected to dimmer switch 12 through power wires 22. Power wires 22 are also connected to a lamp power terminal 26, which (through one or two wires, depending on the type of lamp) provides operational power to a lamp 28. Decoder 16 receives one of the four possible power waveforms from dimmer switch 12 through power wires 22. If dimmer 10 is used in association with a lamp that utilizes a ballast, then decoder 16 may be specifically installed within that ballast (not shown) in fixture 24. For application to an incandescent or halogen lamp, decoder 16 can be simply installed at a convenient location within fixture 24. The power waveform is applied across a resistor $R_D$ and a capacitor $C_D$ of decoder 16. The voltage across capacitor $C_D$, $V_D$ is then applied to load control 18. The output of decoder 16 will be either a fixed positive, fixed negative or zero value as will be further described.

Load control 18 includes a simple dimming control circuit to adjust the output of a ballast or the brightness level of a lamp, in accordance with the value of the output voltage of decoder 16. Load control 18 can be used to adapt dimmer 10 for use with a gas discharge lamp, such as fluorescent, high intensity discharge and others associated with any type of ballast, including conventional non-dimming ballasts.

Alternatively, load control 18 can adapt dimmer 10 for use directly with a non-ballast type lamp, such as an incandescent (which includes halogen) lamp.

Figure 2:
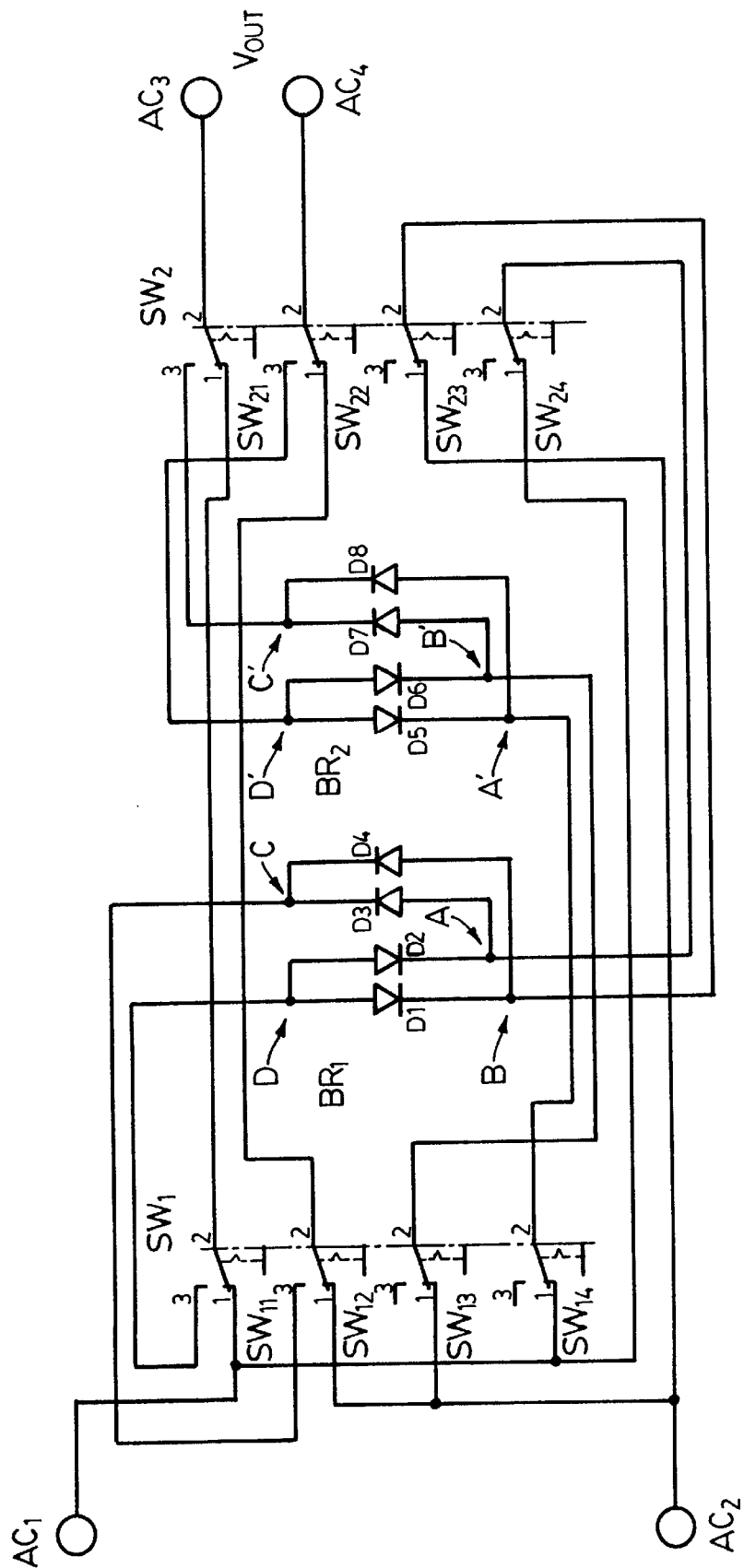
FIG. 2 is a schematic diagram of a dimmer switch according to the present invention.

FIG. 2 shows an electrical schematic of dimmer switch 12, illustrating the interconnections between switches $SW_1$ and $SW_2$ and bridge rectifiers $BR_1$ and $BR_2$ such that four different power waveforms are output to decoder 16, each corresponding to one of four possible configurations of switches $SW_1$ and $SW_2$.

Switches $SW_1$ and $SW_2$ each have four mechanically connected subswitches $SW_{11}$, $SW_{12}$, $SW_{13}$ and $SW_{14}$, and $SW_{21}$, $SW_{22}$, $SW_{23}$, and $SW_{24}$, respectively. Each subswitch has two possible configurations. Contact 2 can be connected either to contact 1 (denoted "(1–2)") or to contact 3 (denoted "(2–3)"). When switch $SW_1$ is "open" or non-depressed, all of the mechanical contacts will have configuration (1–2). When switch $SW_1$ is "closed" or depressed, all of the mechanical contacts will have configuration (2–3).

Bridge rectifier circuits $BR_1$ and $BR_2$ are conventional and each has four diodes D1, D2, D3 and D4 and D5, D6, D7 and D8, connected in series, respectively. AC source 20 can be connected to bridge rectifier $BR_1$ through terminals A and B and non-depressed switch $SW_2$. Similarly, AC source 20 can be connected to bridge rectifier $BR_2$ through terminals A' and B' and non-depressed switch $SW_1$. Bridge rectifier $BR_1$ can be connected to terminals $AC_3$ and $AC_4$ (and thus to decoder 16 and lamp power terminal 26) through terminals C and D and depressed switch $SW_1$. Bridge rectifier $BR_2$ can be connected to terminals $AC_3$ and $AC_4$ through terminals C' and D' and depressed switch $SW_2$. When bridge rectifier $BR_1$ (or $BR_2$) is connected to both AC source 20 and terminals $AC_3$ and $AC_4$, a full wave rectified AC signal will appear on terminals C and D (or C' and D').

When both switches $SW_1$ and $SW_2$ are "open" or non-depressed, AC source 20 is connected to bridge rectifiers $BR_1$ and $BR_2$ via subswitch contacts $SW_{13}$(1–2), $SW_{14}$(1–2), $SW_{23}$(1–2) and $SW_{24}$(1–2). However, since neither bridge rectifier $BR_1$ nor $BR_2$ is connected to the rest of dimmer 10 circuit, bridge rectifiers $BR_1$ and $BR_2$ are inactive. Accordingly, an unmodified AC signal will flow directly from terminals $AC_1$ and $AC_2$, through subswitch contacts $SW_{11}$(1–2), $SW_{12}$(1–2), $SW_{21}$(1–2) and $SW_{22}$(1–2) and through terminals $AC_3$ and $AC_4$ to decoder 16 and lamp power terminal 26. The resulting voltage waveform $V_{OUT}$ across terminals $AC_3$ and $AC_4$ is shown in FIG. 3a and is the same as the input waveform from source 20.

When switch $SW_1$ is depressed and $SW_2$ is non-depressed, AC source 20 is disconnected from the input of bridge $BR_2$ by the subswitch contact $SW_{13}$(2–3) and $SW_{14}$(2–3). The direct AC connection from AC source 20 to terminals $AC_3$ and $AC_4$ is also severed by subswitch contacts $SW_{11}$(2–3) and $SW_{12}$(2–3). Further, terminals C and D of bridge rectifier $BR_1$ are connected to terminals $AC_3$ and $AC_4$ through subswitch contacts $SW_{11}$(2–3) and $SW_{12}$(2–3), respectively such that bridge rectifier $BR_1$ is now active and producing a full wave negatively rectified AC signal, with positive polarity (at terminal C) being connected to terminal $AC_4$ and negative polarity (at terminal D) being connected to terminal $AC_3$. The resulting voltage $V_{OUT}$ is shown in FIG. 3b.

When switch $SW_1$ is non-depressed and $SW_2$ is depressed, the AC input of bridge $BR_1$ is disconnected from the AC line by the subswitch contacts $SW_{23}$(2–3) and $SW_{24}$(2–3) and the direct AC connection between AC source 20 and terminals $AC_3$ and $AC_4$ is severed by subswitch contacts $SW_{21}$(2–3) and $SW_{22}$(2–3). Further, terminals C' and D' of bridge rectifier $BR_2$ are connected to terminals $AC_3$ and $AC_4$ through subswitch contacts $SW_{21}$(2–3) and $SW_{22}$(2–3) respectively such that bridge rectifier $BR_2$ is active and produces a full wave positively rectified AC signal with positive polarity (at terminal C) being connected to $AC_3$ and negative polarity (at terminal D) being connected to $AC_4$. The resulting voltage $V_{OUT}$ is shown in FIG. 3c.

When both switches $SW_1$ and $SW_2$ are depressed, the direct AC connection is severed by both sets of "closed" subswitch contacts $SW_{11}$(2–3), $SW_{12}$(2–3), $SW_{21}$(2–3) and $SW_{22}$(2–3). Further, both sets of terminals C and D and C' and D' of bridge rectifiers $BR_1$ and $BR_2$ are connected to terminals $AC_3$ and $AC_4$ through subswitch contacts $SW_{12}$(2–3), $SW_{11}$(2–3), $SW_{21}$(2–3) and $SW_{22}$(2–3) respectively, such that both bridge rectifiers $BR_1$ and $BR_2$ are active. Since bridge rectifiers $BR_1$ and $BR_2$ each produce rectified AC signals with opposite polarities, zero voltage consequently results across terminals $AC_3$ and $AC_4$ as shown in FIG. 3d.

Since switches $SW_1$ and $SW_2$ can be configured such that the full AC signal can pass directly through the device for full lamp operation or alternatively, such that no voltage is applied to the lamp, dimmer 10 also replaces the on/off functionality of a lamp switch.

Once switches $SW_1$ and $SW_2$ are returned to their normal non-depressed positions, the unmodified AC power again flows directly from terminals $AC_1$ and $AC_2$ through subswitch contacts $SW_{11}$(1–2), $SW_{12}$(1–2), $SW_{21}$(1–2) and $SW_{22}$(1–2) to power wires 22 through terminals $AC_3$ and $AC_4$, with voltage $V_{OUT}$ as shown in FIG. 3a. It will be seen that in FIGS. 3a, 3b and 3c, the RMS value of each half cycle of the waveform is in all cases the same (or substantially the same).

In this way, rectifying stage 14 can produce four different power waveforms for transmission over power wires 22 each corresponding to one of the four possible configurations of switches $SW_1$ and $SW_2$. As previously discussed, either one or both power wires 22 which are connected to decoder 16 are also connected to lamp power terminal 26 (depending on the type of lamp, and as discussed in connection with FIGS. 6a, 6b). It should be noted that when full wave positively or negatively rectified AC signals are provided to lamp power terminal 26 of incandescent lamps or gas discharge lamp ballasts, these devices will continue to operate in a normal fashion.

Specifically, incandescent lamps are normally directly connected to AC voltage and operate based on the $V_{rms}$ of the AC signal received. Since the RMS value of each half cycle of a full wave positively or negatively rectified AC signal is the same as the RMS value of each half cylce of an unmodified or full wave AC signal, an incandescent lamp will not differentiate between a full wave AC signal or a full wave positively or negatively AC rectified signal. The rectifying stage 14 is thus "transparent" to a load which consists of an incandescent lamp, i.e. the load will not notice the changes in waveform, but the changes in waveform can be used for signalling and hence control, without creating RF pollution and without being particularly susceptible to noise.

Ballasts for gas discharge lamps all include a full wave bridge rectifier at the front end of their circuits for rectifying an incoming AC signal. This front end internal bridge rectifier will rectify a full wave positively or negatively rectified AC signal just as it conventionally does a normal full wave AC signal to produce a full wave positively rectified AC signal. As a result, typical ballasts will continue to operate normally regardless of whether the input voltage signal is a normal full wave AC signal, or a full wave positively or negatively rectified AC signal. The rectifying stage 14 is therefore also "transparent" to a gas discharge lamp ballast, i.e. the ballast also will not notice the changes in waveform, yet the changes in waveform can be used as indicated above.

Figure 4:
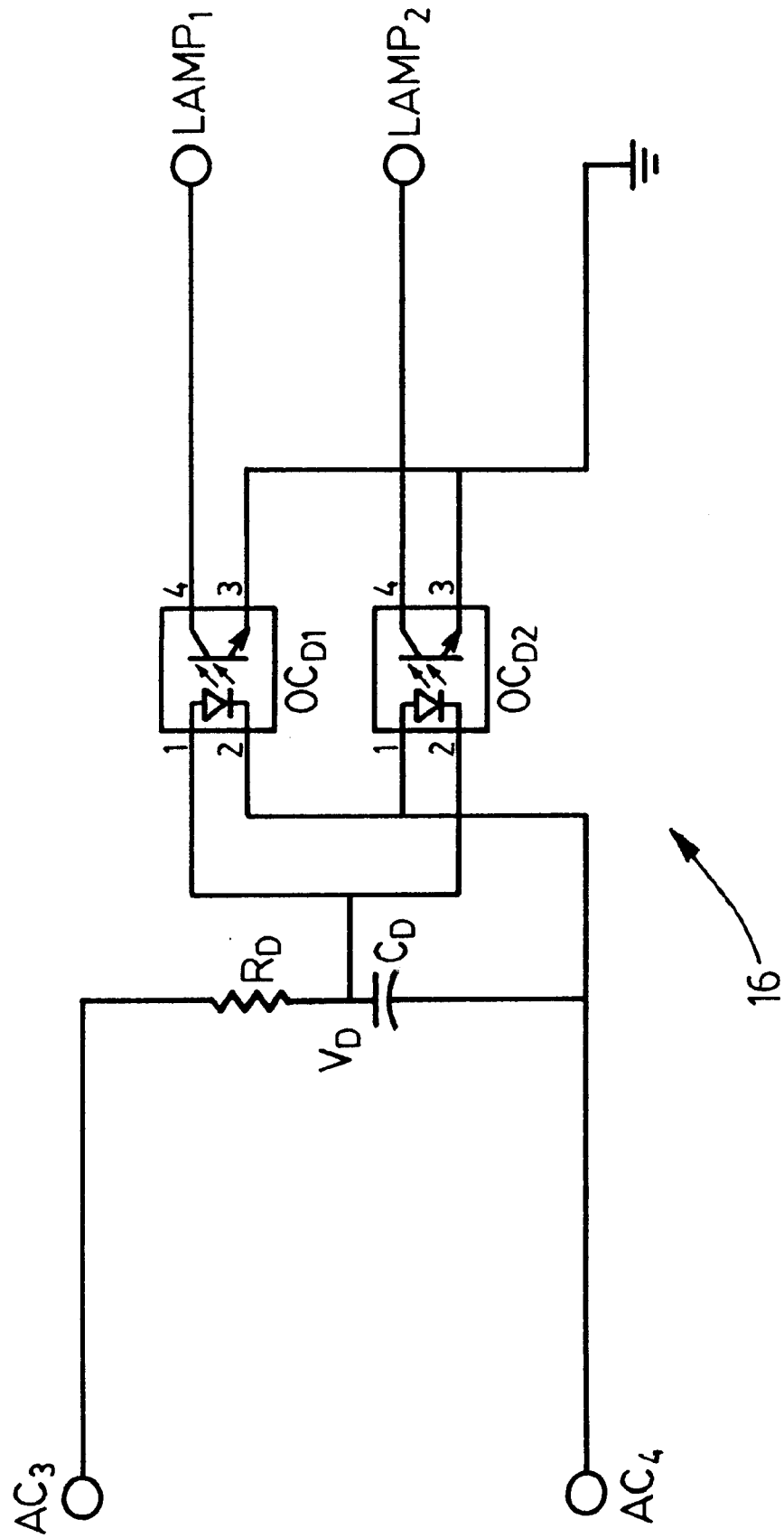
FIG. 4 is a schematic of a simple decoder according to the present invention.

FIG. 4 shows a simple decoder 16 which comprises capacitor $C_D$, resistor $R_D$, and two optocouplers $OC_{D1}$ and $OC_{D2}$. Decoder 16 receives voltage signal $V_{OUT}$ from dimmer switch 12 (not shown in FIG. 4) at terminals $AC_3$ and $AC_4$ and outputs a dimming control signal at terminals $LAMP_1$ and $LAMP_2$ to dimming interface 18 (not shown in FIG. 4). For simplicity, power supply arrangements to the optocouplers are not shown in FIG. 4 but are well known.

Capacitor $C_D$ and resistor $R_D$ are connected in series, with their component values chosen such that the resulting time constant (RC) is longer than the duration of one half of the regular AC signal cycle. This ensures that when the unmodified AC signal shown in FIG. 3a is applied across terminals $AC_3$ and $AC_4$, capacitor $C_D$ will not be able to accumulate sufficient charge to activate optocouplers $OC_{D1}$ and $OC_{D2}$ as will be explained. Although other values and device types can be chosen, capacitor $C_D$ may be a 16 Volt electrolytic capacitor of value 220 $\mu F$ and resistor $R_D$ may have a value of 10 K$\Omega$. While, application of the regular AC signal of FIG. 3a will not cause optocouplers $OC_{D1}$ and $OC_{D2}$ to conduct, application of the full wave negatively or positively rectified voltage of FIG. 3b or 3c, will cause capacitor $C_D$ to commence charging until either optocoupler $OC_{D1}$ or $OC_{D2}$ starts to conduct, as will be explained.

Conventional optocouplers $OC_{D1}$ and $OC_{D2}$ are used within decoder 16 to provide isolation between decoder 16 and device interface 18. Specifically, optocouplers $OC_{D1}$ and $OC_{D2}$ each contain a LED and a phototransistor detector. When current flows through optocoupler $OC_{D1}$ or $OC_{D2}$, light is emitted by the LED. The light is received by the phototransistor detector and the amount of light received determines the amount of current allowed to pass from the collector to the emitter of the phototransistor detector. While other voltage rated optocouplers may be chosen, optocouplers $OC_{D1}$ and $OC_{D2}$ may become operational upon application of a voltage of approximately 1.3 Volts across their respective LEDs.

Figure 5A:
FIG. 5a is a waveform diagram of the voltage across $C_D$ of FIG. 4 when neither switch $SW_1$ or $SW_2$ of FIG. 2 is depressed.

When both switches $SW_1$ and $SW_2$ are non-depressed, an AC signal will be applied across terminals $AC_3$ and $AC_4$, as previously discussed. Since the resulting time constant (RC) is chosen to be approximately 2.2 seconds and since each half AC cycle has a duration of 16.7 milliseconds, voltage $V_D$ will never reach + or −1.3 Volts required to activate the LED of optocoupler $OC_{D1}$ or $OC_{D2}$. Specifically, with preferred values, voltage $V_D$ will be either +0.91 or −0.91 Volts, depending on the polarity of the half cycle. Thus, when a regular AC signal is applied across terminals $AC_3$ and $AC_4$, voltage $V_D$ will consist of an AC signal with amplitude 0.91 Volts as shown in FIG. 5a. Accordingly, neither optocoupler $OC_{D1}$ nor $OC_{D2}$ will conduct, since voltage $V_D$ will not be sufficient to ignite the LED of optocoupler $OC_{D1}$ or $OC_{D2}$, and accordingly, load control 18 will not be triggered.

Figure 5B:
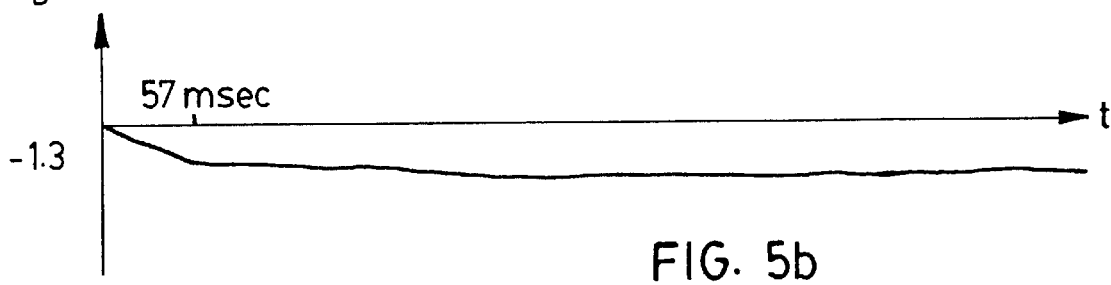
FIG. 5b is a waveform diagram of the voltage across $C_D$ of FIG. 4 when switch $SW_1$ of FIG. 2 is depressed.

When switch $SW_1$ is depressed, dimming switch 12 provides a rectified AC signal with negative polarity at terminal $AC_3$ and positive polarity at terminal $AC_4$ as previously described. Accordingly, current will flow into capacitor $C_D$ from terminal $AC_3$ and $AC_4$ and capacitor $C_D$ will commence charging. Capacitor $C_D$ will charge to −1.3 Volts within 23.8 milliseconds as shown in FIG. 5b. When voltage $V_D$ reaches −1.3 Volts, the LED of optocoupler $OC_{D2}$ will ignite and cause the transistor of $OC_{D2}$ to open and provide voltage $V_D$ to terminal $LAMP_2$. Since the charging time is 23.8 milliseconds, when a user presses switch $SW_1$, optocoupler $OC_{D2}$ will start conducting before the user can physically release switch $SW_1$ to ensure operational reliability.

As long as switch $SW_1$ remains depressed, capacitor $C_D$ will remain charged such that voltage $V_D$ is −1.3 Volts. Once $SW_1$ is released, $C_D$ will start discharging into the LED circuit and $V_D$ will fall below the voltage required to activate optocoupler $OC_{D2}$. Consequently, the transistor of optocoupler $OC_{D2}$ will close and no voltage will appear across terminals $LAMP_1$ and $LAMP_2$.

Figure 5C:
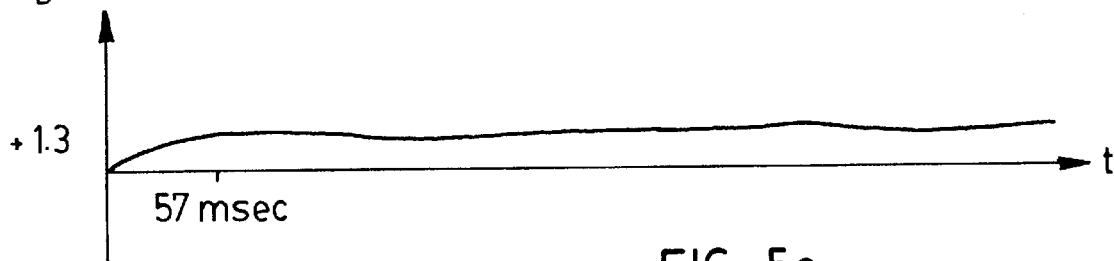
FIG. 5c is a waveform diagram of the voltage across $C_D$ of FIG. 4 when switch $SW_2$ of FIG. 2 is depressed.

When switch $SW_2$ is depressed and switch $SW_1$ is non-depressed, dimming control 12 provides a full wave positively rectified AC signal with positive polarity at terminal $AC_3$ and negative polarity at terminal $AC_4$. Accordingly, current will flow into capacitor $C_D$ from terminal $AC_3$ to $AC_4$ and capacitor $C_D$ will commence charging. Voltage $V_D$ will accordingly rise to the value of +1.3 Volts within 23.8 milliseconds in an analogous manner as described above, as shown in FIG. 5c. When voltage $V_D$ reaches +1.3 Volts, the LED of optocoupler $OC_{D1}$ will be ignited and the transistor of $OC_{D1}$ will open and provide voltage $V_D$ to terminal $LAMP_1$. Again, since voltage $V_D$ reaches +1.3 Volts within 23.8 milliseconds, optocoupler $OC_{D1}$ will start conducting before the user can physically release switch $SW_2$ to ensure operational reliability.

As long as switch $SW_2$ is held, capacitor $C_D$ will remain charged with voltage $V_D$ being +1.3 Volts. Again, once $SW_2$ is released, $C_D$ will start discharging into the LED circuit and $V_D$ will drop below the voltage required to activate optocoupler $OC_{D1}$. Consequently, the transistor of optocoupler $OC_{D1}$ will close and zero voltage will appear across terminals $LAMP_1$ and $LAMP_2$.

Figure 5D:
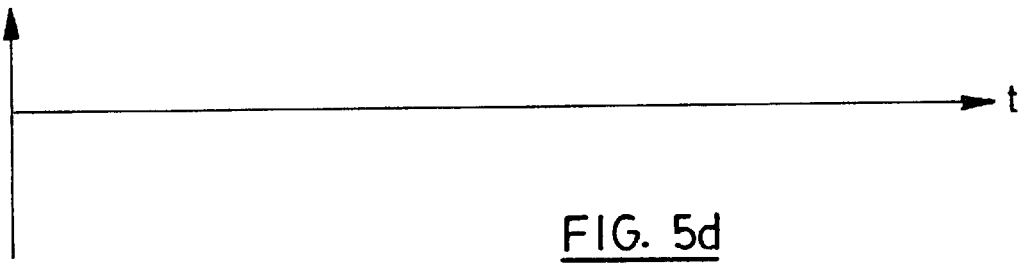
FIG. 5d is a waveform diagram of the voltage across $C_D$ of FIG. 4 when both switches $SW_1$ and $SW_2$ of FIG. 2 are depressed.

When both switches $SW_1$ and $SW_2$ are depressed, dimming control 12 provides zero voltage across terminals $AC_3$ and $AC_4$ as previously described. Accordingly, no current will flow into capacitor $C_D$, $V_D$ will be zero (as shown in FIG. 5d) and no voltage will appear across terminals $LAMP_1$ and $LAMP_2$.

In this manner, either +1.3 V, −1.3 V or 0 V DC, will be applied across terminals $LAMP_1$ and $LAMP_2$ for input into dimming interface or load control 18.

FIG. 6a shows an exemplary load control 18a for use in association with an incandescent lamp 28. Load control 18a comprises a microcontroller 40, timer circuit 42 and a triac $Q_{10}$. It should be noted that while a simple dimming method for incandescent lamps has been chosen for illustrative purposes, load control 18 may be adapted to incorporate various other known incandescent dimming circuitry.

Microcontroller 40 may be any commercially available programmable device such as a Motorola 6800 microcontroller, although it should be understood that any type of logic circuit with similar operating functions can be utilized. Storage of program instructions and other static data is provided by a read only memory (ROM) 44, while storage of dynamic data is provided by a random access memory (RAM) 46. Both memory units 44 and 46 are controlled and accessed by microcontroller 40.

Timer 42 is a widely used Model 555 timer which utilizes an RC oscillator to produce a constant timing frequency signal. An applied reference signal produces a first polarity output. An opposite polarity output is produced at a time thereafter determined by an applied DC level.

Triac $Q_{10}$ is a conventionally bidirectional thyristor or a triac. It should be understood that triac $Q_{10}$ could be any other type of semiconductor switching element, such as a single thyristor or two thyristors arranged in anti-parallel configuration. Triac $Q_{10}$ is connected in series with lamp 28 to control the application of power from lamp power terminal 26 to lamp 28 in a known manner. When triac $Q_1$ is fully conducting, a maximum amount (approximately 95%) of current flows through lamp 28. When triac $Q_{10}$ is not conducting, a minimum amount of current (approximately 5%) flows through lamp 28. By controlling the period of conduction of triac $Q_{10}$, the current through lamp 28 can be varied between the dim and full lamp current values.

Microcontroller 40 is connected to terminals $LAMP_1$ and $LAMP_2$ and operates in accordance with the voltage present across these terminals. Microcontroller 40 uses timer circuit 30 to generate a gate signal which, when applied to the gate of triac $Q_{10}$, will affect the time of firing (or the electrical conduction angle) of triac $Q_{10}$. By controlling the time of firing of the triac $Q_{10}$, microcontroller 40 can control the percentage of time lamp 28 is on, and thus the intensity of lamp brightness.

Microcontroller 40 is programmed to poll the voltage present across terminals $LAMP_1$ and $LAMP_2$, on a regular basis, such as (e.g.) every 0.5 seconds. If this voltage is zero, microcontroller 40 will not change the frequency of the signal being output to the gate of triac $Q_{10}$ or the gating signal. However, if microcontroller 40 detects a positive or negative voltage across terminals $LAMP_1$ and $LAMP_2$, microcontroller 40 is programmed to increase or decrease, respectively, the frequency of the gating signal in a step-wise manner. Microcontroller 40 continues to increment the frequency of the gating signal until a zero voltage is detected across terminals $LAMP_1$ and $LAMP_2$ or until a maximum or minimum brightness is reached. Each increment step has a duration of (e.g.) approximately 1 second to allow the user sufficient time to select the appropriate brightness for lamp 28.

When neither switch $SW_1$ nor $SW_2$ is depressed, the voltage present across terminals $LAMP_1$ and $LAMP_2$ will be zero. Accordingly, microcontroller 40 will not change the frequency of the gate signal being applied to the gate of triac $Q_{10}$ and no change in light intensity will result.

If switch $SW_1$ is depressed then microcontroller 40 will detect a negative voltage across terminals $LAMP_1$ and $LAMP_2$ and will decrease the frequency of the gating signal until the minimum brightness level is reached, or until the user releases switch $SW_1$, or until the user additionally depresses switch $SW_2$. If the user releases switch $SW_1$, microcontroller 40 will maintain the gating signal at the attained frequency value. This allows a user to dim lamp 28 to a desired brightness level by depressing switch $SW_1$ until that level is reached. If user additionally depresses switch $SW_2$, then zero power will be provided through power wires 22, and microcontroller 40 then causes lamp 28 to turn off (by shutting off triac $Q_{10}$).

If switch $SW_2$ is depressed then microcontroller 40 will detect a positive voltage across terminals $LAMP_1$ and $LAMP_2$ and increase the frequency of the gating signal until the maximum brightness level is reached, or until the user releases switch $SW_2$, or until the user additionally depresses switch $SW_1$. If the user releases switch $SW_2$, microcontroller 40 will maintain the gating signal at the attained frequency value. This allows a user to increase the brightness of lamp 28 to a desired level by depressing switch $SW_2$ until that level is reached. If user additionally depresses switch $SW_1$, then zero power will be provided through power wires 22 and lamp 28 will turn off.

FIG. 6b shows an exemplary load control 18b adapted for use with a ballast-type gas discharge lamp 28. Load control 18b utilizes a microcontroller 50 and a timer 52 to change the operating oscillation frequency or duty cycle of the power of a typical electronic ballast. Microcontroller 50 is of similar specification to microcontroller 40 with ROM 51 and RAM 53. It should be noted that although the following discussion relates to the adaptation of a very simple and typical electronic ballast, it is possible to adapt the present invention within any type of lamp ballast by suitably controlling ballast power.

A typical electronic ballast, as is well known, includes a bridge rectifier 54, a boost converter 56, an inverter 58 and a resonance circuit 60. AC signal 20 is passed through bridge rectifier 54 and into boost converter 56. Boost converter 56 provides a regulated voltage to inverter 58. Inverter 58 changes the DC voltage to AC voltage at high frequencies and includes transistors $Q_{11}$ and $Q_{12}$ at its output. The signal generated by transistors $Q_{11}$ and $Q_{12}$ is typically applied to resonance circuit 60. Resonance circuit 60 is directly coupled to lamp 28 and is commonly used to avoid the necessity of an output transformer. Dimming is typically achieved by varying the frequency of operation of inverter 58 by controlling the operation of transistors $Q_{11}$ and $Q_{12}$.

Microcontroller 50 and timer 52 are configured to form a voltage controlled oscillator which changes the oscillation frequency or duty cycle of ballast power, in response to the voltage across terminals $LAMP_1$ and $LAMP_2$. Specifically, microcontroller 50 provides a variable square wave output to drive transistors $Q_{11}$ and $Q_{12}$ of inverter 58 to change the frequency of operation of inverter 58. By varying the frequency of the square wave output of microcontroller 50, the operational frequency of inverter 58 is suitably affected.

As previously described, microcontroller 50 regularly polls to check the voltage present across terminals $LAMP_1$ and $LAMP_2$. If this voltage is determined to be zero (ie. while both switch $SW_1$ and $SW_2$ are non-depressed), microcontroller 50 will not change the operation of inverter 58 and no change in light intensity will result.

If switch $SW_1$ is depressed, then microcontroller 50 will detect a negative voltage across terminals $LAMP_1$ and $LAMP_2$ and provide a control signal to inverter 58 such that lamp 28 is dimmed until the minimum brightness level is reached, or until the user releases switch $SW_1$, or until the user additionally depresses switch $SW_2$. If the user releases switch $SW_1$, microcontroller 50 will maintain the operation of inverter 58 at that value. This allows a user to dim lamp 28 to a desired brightness level by depressing switch $SW_1$ until that level is reached. If user additionally depresses switch $SW_2$, then zero power will be provided through power wires 22 and lamp 28 will turn off.

If switch $SW_2$ is depressed then microcontroller 50 will detect a positive voltage across terminals $LAMP_1$ and $LAMP_2$ and provide a control signal to inverter 58 such that the frequency of the oscillation of inverter 58 is increased until the maximum brightness level is reached, or until the user releases switch $SW_2$, or until the user additionally depresses switch $SW_1$. If the user releases switch $SW_2$, microcontroller 50 will not change the operation of inverter 58 and no change in light intensity will result. This allows a user to increase the brightness of lamp 28 to a desired level by depressing switch $SW_2$ until that level is reached. If user additionally depresses switch $SW_1$, then zero power will be provided through power wires 22 and lamp 28 will turn off.

Accordingly, dimmer 10 can be adapted for use with a variety of lamps including gas discharge, halogen and incandescent lamps, using the appropriate load control 18a or 18b.

Figure 7:
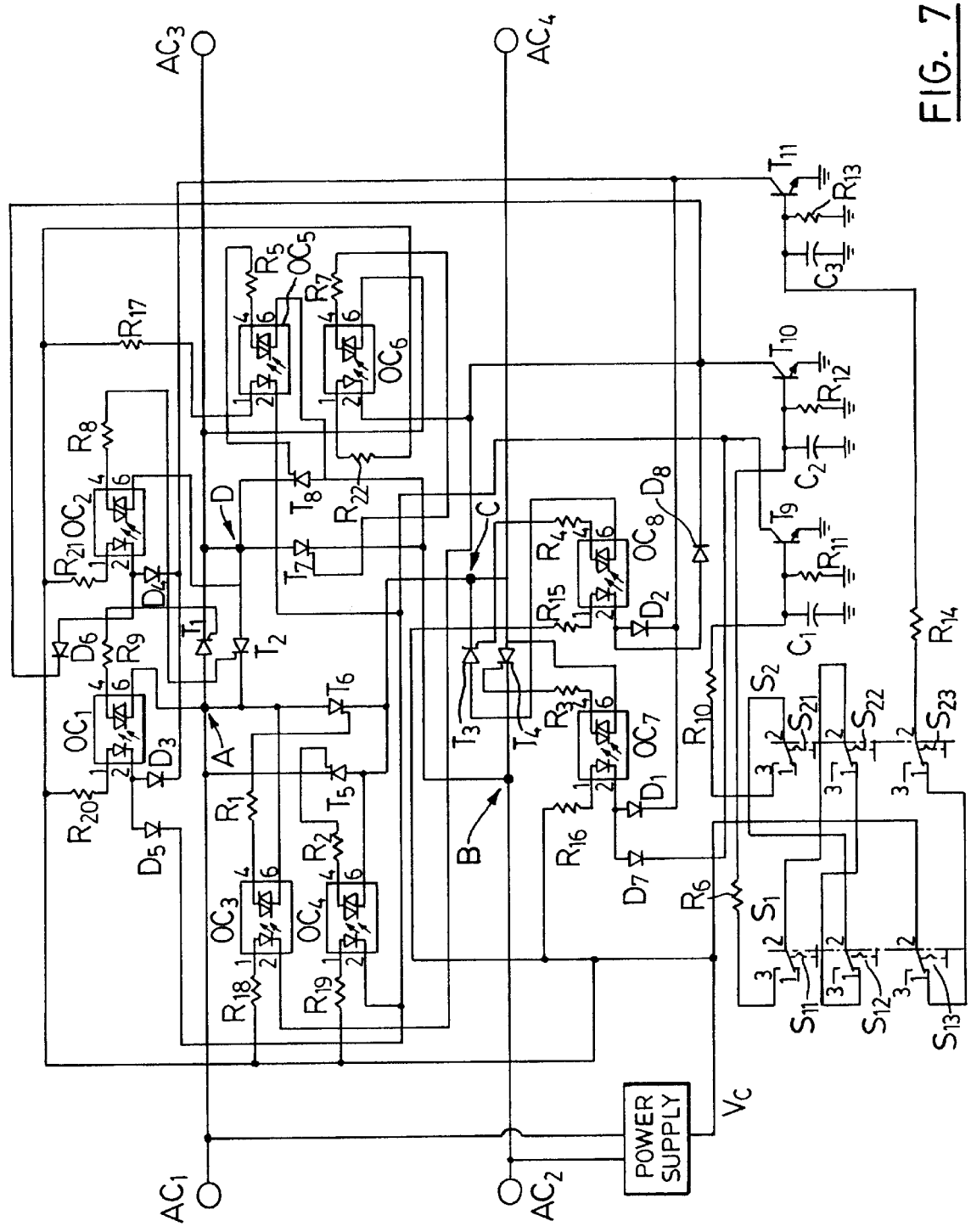
FIG. 7 is a schematic of an alternative dimmer switch according to the invention.

FIG. 7 shows an electronic schematic of an alternative dimmer switch 12 and rectifying stage 14. Since simple mechanical connectors can cause load flickering, SCRs and zero-crossing optocouplers are utilized for flicker-free operation. As before, terminals $AC_1$ and $AC_2$ connect dimmer switch 12 to AC source 20 and terminals $AC_3$ and $AC_4$ connect dimming switch 12 to decoder 16 and to input power terminal 26.

Switches $SW_1$ and $SW_2$ of FIG. 2 are implemented using two switches $S_1$ and $S_2$ connected to transistors $T_9$, $T_{10}$ and $T_{11}$. Bridge rectifiers $BR_1$ and $BR_2$ of FIG. 2 are implemented using SCRs $T_2$, $T_3$, $T_6$, and $T_7$ and SCRs $T_1$, $T_4$, $T_5$, and $T_8$, respectively as will be described. All transistors $T_9$, $T_{10}$ and $T_{11}$, SCRs $T_1$, $T_2$, $T_3$, $T_4$, $T_5$ $T_6$, $T_7$, $T_8$ and switches $S_1$ and $S_2$ are powered using a conventional power supply 62 which produces voltage $V_C$.

When neither switch $SW_1$ nor $SW_2$ is depressed, the base of transistor $T_{11}$ is connected to $V_C$ through subswitch contact $S_{13}(1-2)$ and $S_{23}(1-2)$ and thus transistor $T_{11}$ is conductive. Transistor $T_{11}$ will switch on the LEDs of optocouplers $OC_1$, $OC_2$, $OC_7$ and $OC_8$ which will switch on SCR's $T_1$, $T_2$, $T_3$, and $T_4$ at the zero crossing points of the AC signal present on terminals $AC_1$ and $AC_2$. Accordingly, an AC signal will flow directly from terminals $AC_1$ and $AC_2$ to terminals $AC_3$ and $AC_4$.

When switch $S_1$ is depressed and switch $S_2$ is nondepressed, the base of transistor $T_{10}$ is connected to $V_C$ through subswitch contact $S_{11}(2-3)$ and transistor $T_{11}$ is disconnected from $V_C$ by subswitch contact $S_{13}(2-3)$. Accordingly, transistor $T_{10}$ will conduct and switch on optocouplers $OC_2$, $OC_3$, $OC_6$ and $OC_8$ which will switch on SCR's $T_2$, $T_3$, $T_6$, and $T_7$. SCR's $T_2$, $T_3$, $T_6$, and $T_7$ form a bridge rectifier (analogous to BR1 of FIG. 2), with an AC signal being input to terminals A and B and a full wave rectified AC signal with positive polarity (at terminal C) being connected to $AC_4$ and negative polarity (at terminal D) being connected to $AC_3$. The resulting voltage $V_{OUT}$ will be the same as that shown in FIG. 3b.

When switch $S_1$ is not depressed and switch $S_2$ is depressed, the base of transistor $T_9$ is connected to voltage $V_D$ through subswitch contact $S_{21}(2-3)$ and base of transistor $T_{10}$ is disconnected from $V_C$ by subswitch contact $S_{11}(1-2)$. Accordingly, transistor $T_9$ will conduct and switch on optocouplers $OC_1$, $OC_4$, $OC_5$ and $OC_7$ which will switch on SCR's $T_1$, $T_4$, $T_5$, and $T_8$. SCRs $T_1$, $T_4$, $T_5$, and $T_8$ form a bridge rectifier (analogous to BR2 of FIG. 2), with an AC signal being input to terminals A and B and a full wave rectified AC signal with positive polarity (at terminal D) being connected to $AC_3$ and negative polarity (at terminal C) being connected to $AC_4$. The resulting voltage $V_{OUT}$ which results from switch $SW_1$ being depressed will be the same as that shown in FIG. 3c.

When both switches $S_1$ and $S_2$ are depressed, both outputs of bridge rectifiers $BR_1$ and $BR_2$ are connected to terminals $AC_3$ and $AC_4$ through subswitch contacts $S_{11}(2-3)$, $S_{12}(2-3)$, $S_{21}(2-3)$ and $S_{22}(2-3)$ such that both bridge rectifiers $BR_1$ and $BR_2$ are active. Since bridge rectifiers $BR_1$ and $BR_2$ produce AC signals with opposite polarities, zero voltage appears across terminals $AC_3$ and $AC_4$. The resulting voltage $V_{OUT}$ is the same as that shown in FIG. 3d.

In use, dimmer 10 may be used to dim, brighten, turn on, or turn off lamp 28, by appropriately depressing switches $SW_1$ and/or $SW_2$. When lamp 28 is off, lamp 28 can be turned on by several switch configurations. For example, microcontroller 40 or 50 may be programmed to toggle lamp 28 power alternately on and off when lamp 28 has been off and it subsequently detects that voltage $V_D$ is zero (i.e. both switches $SW_1$ and $SW_2$ are depressed). Alternatively, microcontroller 40 or 50 may be programmed to apply full power to lamp 28 when lamp 28 has been off and subsequently it detects that either voltage $V_D$ is −1.3 Volts or +1.3 Volts (i.e. switch $SW_1$ or $SW_2$ has been depressed).

Once on, the brightness of lamp 28 can be dimmed by depressing switch $SW_1$. When switch $SW_1$ is depressed, dimmer 10 will cause dimming of lamp 28 in a step-wise manner until the user determines that an appropriate lighting intensity has been reached and releases switch $SW_1$. The intensity of lamp 28 will remain set at this level until the user requires further dimming or brightening. If increased brightness is desired, the user depresses switch $SW_2$, which will cause dimmer 10 to increase the brightness of lamp 28 in a step-wise manner until the desired level has been reached and switch $SW_2$ is released. The user may turn lamp 28 off at any time by depressing both switches $SW_1$ and $SW_2$.

Figure 8:
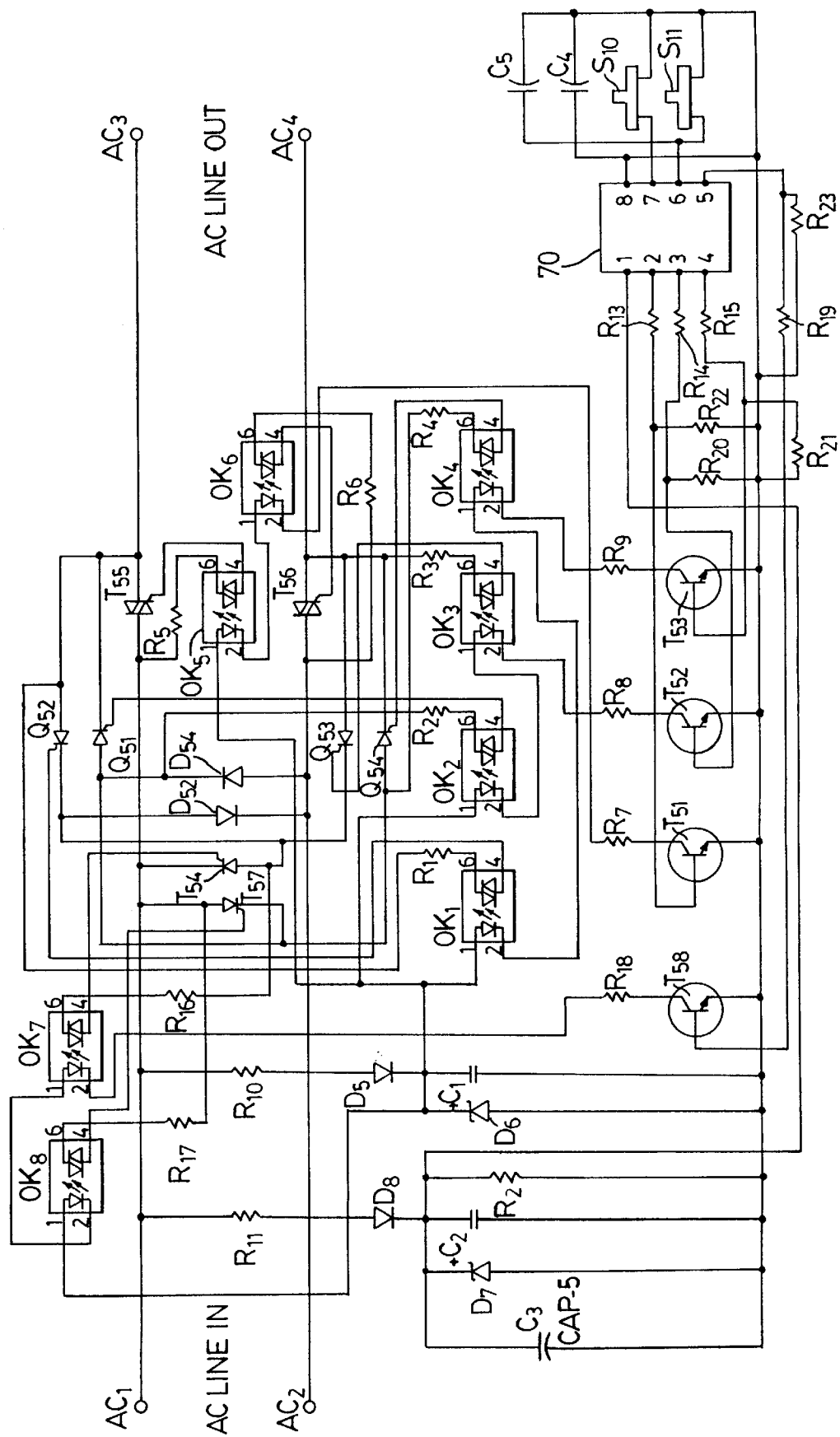
FIG. 8 is a schematic of another alternative dimmer switch and rectifying stage according to the invention.

FIG. 8 shows an implementation of dimmer 10 using a microcontroller 70, which may typically be microcontroller PIC 12c 508 supplied by Microchip Technology Inc. of Chandler, Ariz., U.S.A. Microcontroller 70 has pin 1 connected to a positive supply voltage (not shown), pin 8 connected to ground, and pins 6 and 7 connected to push-button switches $S_{10}$ and $S_{11}$ respectively to function as inputs. (Capacitors $C_4$, $C_5$ are connected across the switches $S_{10}$, $S_{11}$ to act as debouncers). Pins 2 to 5 inclusive function as outputs. Microcontroller 70 has the operating characteristics that with switches $S_{10}$, $S_{11}$ open, pins 2 to 5 inclusive are normally low. If either switch is pushed, pin 2 goes high. If the pushed switch is released before one second, pin 2 remains high until further action is taken. The remaining outputs stay low. If both switches are pushed simultaneously, then all pins become low and stay low. (The reference to "all pins" means the output pins 2 to 5.)

If switch $S_{10}$ is pushed and held more than one second, then pin 2 becomes low, and 12 milliseconds after the time when pin 2 became low, pins 3 and 5 become high and stay high as long as switch $S_{10}$ remains pushed, but if switch $S_{10}$ is held in closed position for more than 20 seconds, then pins 3 and 5 become low again. The same applies for switch $S_{11}$, except that after it has been held for more than one second, pins 4 and 5 go high and then after 20 seconds go low.

Power to terminal 1 of microcontroller 70 is derived from the AC input line, by means of diode $D_8$, zener diode $D_7$, capacitors $C_2$ and $C_3$, and resistor $R_{12}$. Power for the remainder of the FIG. 8 circuit is providedfrom the AC input line via diode $D_5$, zener diode $D_6$, and capacitor $C_1$.

FIG. 8 will best be understood from a description of its operation, which is as follows. Normally, with neither switch $S_{10}$ nor switch $S_{11}$ pushed, pins 2, 3, 4 and 5 are all low. AC input terminals $AC_1$, $AC_2$ are disconnected from the output terminals $AC_3$, $AC_4$ by triacs $T_{55}$, $T_{56}$, which are turned off.

If either switch $S_{10}$, $S_{11}$ is touched, and provided that it is touched only for a brief instant, pin 2 of microcontroller 70 goes high. This switches on transistor $T_{51}$, turning on optocouplers $OK_6$, $OK_5$ and thus turning on triacs $T_{55}$, $T_{56}$. Triacs $T_{55}$, $T_{56}$ connect the AC signal at input terminals $AC_1$, $AC_2$ to output terminals $AC_3$, $AC_4$, producing an unmodified AC power signal (as shown in FIG. 3a) at terminals $AC_3$, $AC_4$ (e.g. to operate a lamp at full brightness).

If during AC operation as described above, both switches $S_{10}$, $S_{11}$ are touched at the same time, then all pins of microcontroller 70 go low, switching off all circuitry. This disconnects the AC power from terminal $AC_3$ and $AC_4$, in effect turning off the lamp.

If switch $S_{10}$ is then pushed and held for more than one second, pin 2 goes high and then low but 12 milliseconds after pin 2 goes low, pins 3 and 5 go high. This turns on transistors $T_{52}$, $T_{58}$, thus turning on optocouplers $OK_7$, $OK_8$ and $OK_3$, $OK_2$. Optocouplers $OK_7$, $OK_8$ turn on thyristors $T_{57}$, $T_{54}$ while optocouplers $OK_3$, $OK_2$ turn on thyristors $Q_{51}$, $Q_{53}$. Thyristors $T_{57}$, $T_{54}$ together with diodes $D_{52}$, $D_{54}$ form a bridge rectifier (which can be switched on and off by means of the thyristors $T_{57}$, $T_{54}$), producing a full wave rectified negative going output waveform (as shown in FIG. 3b) which is connected by $Q_{51}$, $Q_{53}$ to output terminals $AC_3$, $AC_4$. This waveform continues until switch $S_{10}$ is released, or after 20 seconds (whichever is first) at which time pins 3, 5 go low, switching off the components listed above. The unmodified AC waveform at output terminals $AC_3$, $AC_4$ is then restored.

Similarly, if the user pushes switch $S_{11}$ for more than one second, pin 2 goes high and then low (switching off the normal AC from the output terminals), and after a 12 millisecond delay (to allow the components time to switch off), pins 4, 5 go high. This turns on transistors $T_{53}$, $T_{58}$. Transistor $T_{53}$ turns on optocouplers $OK_4$, $OK_1$ which triggers thyristors $Q_{54}$, $Q_{52}$. Transistor $T_{58}$ activates optocouplers $OK_7$, $OK_8$ and consequently thyristors $T_{57}$, $T_{54}$. Via thyristors $Q_{52}$, $Q_{54}$ this produces a positive going output on terminals $AC_4$ with respect to $AC_3$, as shown in FIG. 3c.

It will be seen that in the FIG. 8 arrangement, only one bridge is used ($T_{57}$, $T_{54}$, $D_{52}$, $D_{54}$). This bridge can be switched on and off (using $T_{57}$, $T_{54}$) and can be connected to produce a positive or negative going waveform at output terminals $AC_3$ $AC_4$, depending on whether $Q_{51}$, $Q_{53}$ or $Q_{52}$, $Q_{54}$ are triggered. In addition, the only mechanical switches used are $S_{10}$, $S_{11}$.

When switch $S_{11}$ is released, after switch $S_{11}$ has been held for 20 seconds, pins 4, 5 go low, and after 12 milliseconds, pin 2 goes high and the AC signal at the inputs $AC_1$, $AC_2$ is again connected to the outputs $AC_3$, $AC_4$.

To switch the dimmer (and hence the lamp) off, both buttons are pushed simultaneously, causing all pins to go low, as previously described.

Figure 9:
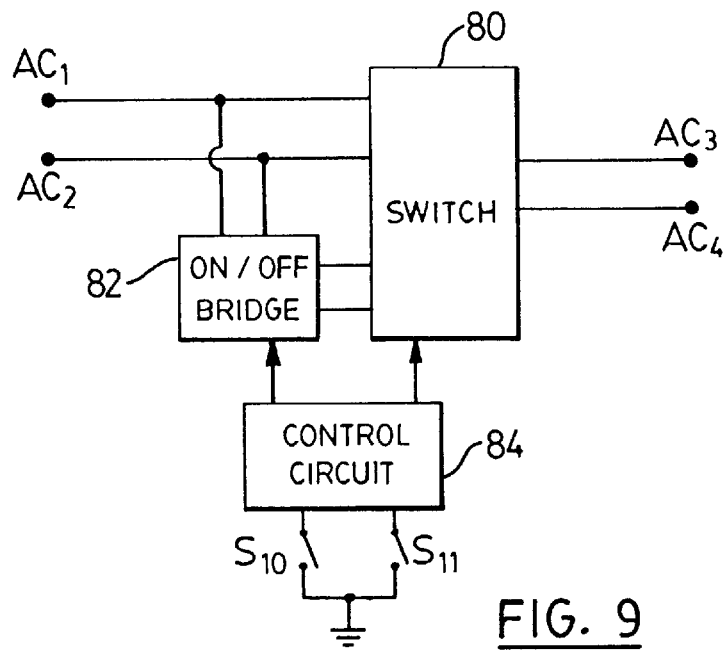
FIG. 9 is a block diagram of the FIG. 8 circuit.

FIG. 8 may be depicted more generally as shown in FIG. 9. Input terminals $AC_1$, $AC_2$ are connected via a selectable switch 80 to input terminals $AC_3$, $AC_4$. Terminals $AC_1$, $AC_2$ are also connected via on/off bridge 82 to switch 80 and hence to terminals $AC_3$, $AC_4$. The bridge 82 and switch 80 are controlled by control circuit 84 which is in turn controlled by any desired inputs, e.g. switches $S_{10}$, $S_{11}$. In FIG. 9, the bridge 82 may be the FIG. 8 bridge comprising thyristors $T_{54}$, $T_{57}$ and diodes $D_{52}$, $D_{54}$ (so that the bridge can be switched on or off by triggering $T_{54}$, $T_{57}$), while switch 80 may be triacs $T_{55}$, $T_{56}$ and thyristors $Q_{51}$, $Q_{53}$, $Q_{52}$, $Q_{54}$, which either connect terminals $AC_1$, $AC_2$, directly to $AC_3$, $AC_4$, or make the connection through a positive or negative orientation of bridge 82. Control circuit 84 may be optocouplers $OK_1$ to $OK_8$, and control transistors $T_{51}$, $T_{52}$, $T_{53}$, $T_{58}$, and microcontroller 70.

In the embodiments described above, the half cycles of the power waveform (negative going as shown in FIG. 3b or positive going as shown in FIG. 3a) have been used for signalling and hence control, but as always, without disturbing the RMS value of each half cycle of the power waveform. While the RMS value of the voltage may vary depending on fluctuations in the supply voltage from the mains, such fluctuations will not affect the operation of the dimmer since they have little or no influence on detection of the sequence of half cycles which are used for signalling and control. In addition, the method described does not introduce harmonic distortion into the power waveform, nor does it affect the power factor. As mentioned, the method is transparent to the load, which treats the sequence of half cycles as if it were an unmodified AC waveform.

Figure 10:
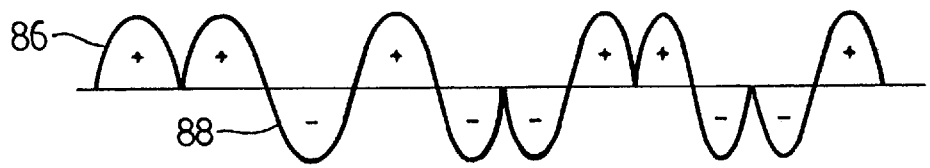
FIG. 10 is a diagram showing a modified waveform transmitted by a dimmer switch and rectifying stage according to the invention.

It will be realized, however, that other methods can be used for signalling which have all or substantially all of the advantages of the system described above. For example, as shown in FIG. 10, the power waveform can be rectified to provide a sequence of positive going half cycles 86 (which can be considered as "ones") and negative going half cycles 88 (which can be considered as "zeros"). Sequences such as that shown in FIG. 10 can readily be produced by the circuit of FIG. 9, using an appropriate control circuit 84. To produce the FIG. 10 waveforms, control circuit 84 may be of the form shown and described in FIG. 8, but with microcontroller 70 replaced by a different and suitably programmed microcontroller having as inputs either switches $S_{10}$, $S_{11}$, or any other desired inputs. Again, each half cycle of the FIG. 10 waveform has the same RMS value as does a half cycle of the unmodified AC waveform.

When a signal of the form shown in FIG. 10 is used to power a resistive load such as an incandescent lamp, the lamp will again treat such signal as being a conventional power signal, the RMS value of which has not been changed. When the load includes an input full wave rectifier, as does a gas discharge lamp (as shown at 54 in FIG. 6b), the input full wave rectifier simply rectifies the waveform shown in FIG. 10 and is not affected by the coding.

The FIG. 10 waveform can be decoded by any appropriate decoder 16. The decoder can include a microprocessor programmed to detect any desired sequence of positive and negative half cycles and to output a control signal of appropriate form to the dimming interface 18 or to any other load controlled by the system. If desired for the FIG. 10 waveform, the coding can be arranged so that the code to be acted on is either exactly two positive half cycles or two negative cycles. If there are more or less than two consecutive positive or negative half cycles, the decoder 16 would treat that part of the waveform as uncoded. This will ensure that conventional AC waveforms, and full wave rectified waveforms, do not affect the decoder.

Figure 11:
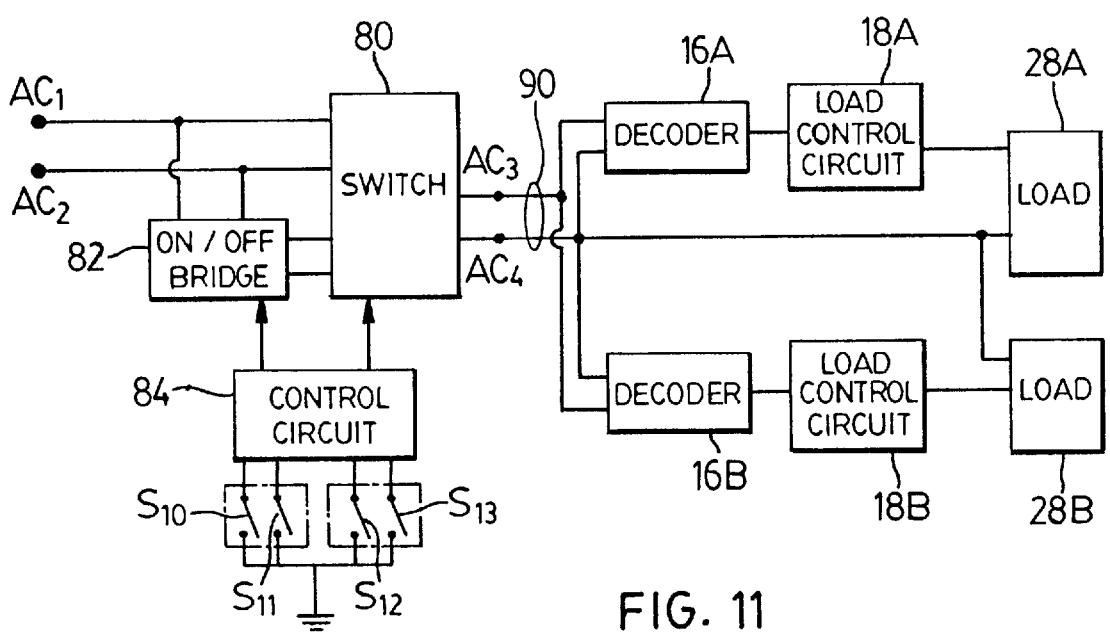
FIG. 11 is a block diagram showing a modification of the FIG. 9 circuit.

If desired, a single dimmer switch can be used to control more than one lamp or load. This can be accomplished by using the arrangement of FIG. 11, which corresponds to that of FIG. 9 but has two sets of user operated switches or buttons $S_{10}$, $S_{11}$ and $S_{12}$, $S_{13}$. Terminals $AC_3$, $AC_4$ are connected through a common set of wires 90 to two decoders 16A, 16B which in turn are connected to respective dimming interfaces or load control circuits 18A, 18B, which in turn are connected to loads (usually lamps) 28A, 28B. One set of switches $S_{10}$, $S_{11}$ causes bridge 82 and switch 80 to produce output waveform cycle sequences of half cycles which are decoded by decoder 16A to control only load control circuit 18A which controls load 28A. The other set of switches $S_{12}$, $S_{13}$ does the same for load 28B. In all cases, power for both loads is conducted along the common wires 90 and may be unmodified AC or may be the particular sequences of half cycles which are also used for control. If desired, switches $S_{10}$ to $S_{13}$ may take any user-friendly form, e.g. two slide switches, or a single slide switch operated in one direction to operate load 28A and in the other direction to operate load 28B (if the loads are intended to operate only alternatively), with appropriate programming. Similarly, three or more loads can be powered and controlled along a common set of wires, by using sufficient selected sequences of half cycles as codes, for control, and for power. In all cases, the RMS value of each half cycle will be substantially the same as for corresponding half cycles of the unmodified AC waveform.

If desired, the sequences of half cycles used for coding (and for power) can include a combination of the sequences shown in FIGS. 3a to 3d and FIG. 10.

Figure 3:
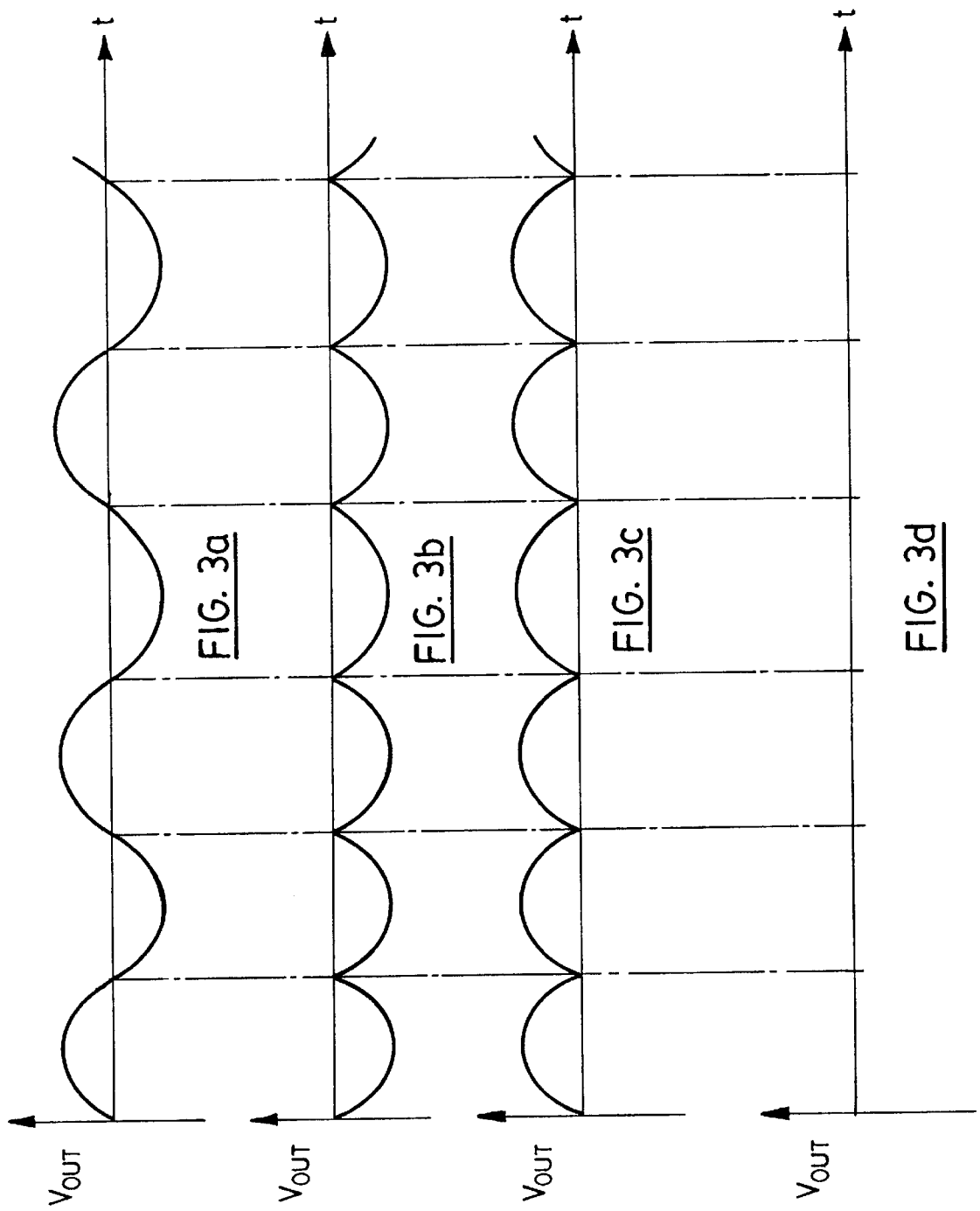
FIG. 3a is a waveform diagram of the voltage at the output of the dimmer switch when neither switch $SW_1$ nor $SW_2$ of FIG. 2 is depressed.
FIG. 3b is a waveform diagram of the voltage at the output of the dimmer switch when switch $SW_1$ of FIG. 2 is depressed.
FIG. 3c is a waveform diagram of the voltage at the output of the dimmer switch when switch $SW_2$ of FIG. 2 is depressed.
FIG. 3d is a waveform diagram of the voltage at the output of the dimmer switch when both switches $SW_1$ and $SW_2$ of FIG. 2 are depressed.
Figure 12:
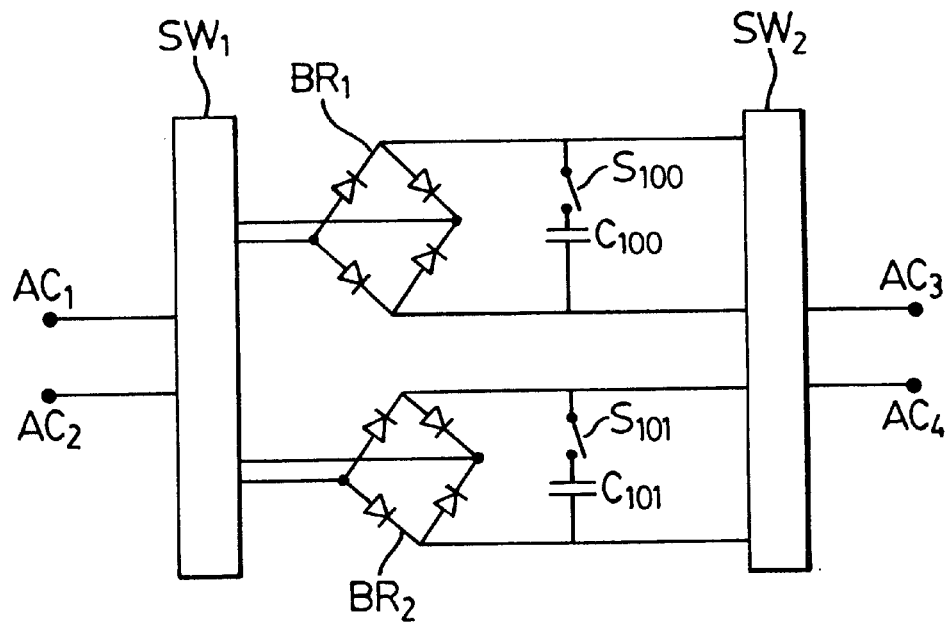
FIG. 12 shows a further modification of the dimmer switch and rectifying stage of FIG. 2.

If the load is relatively small (e.g. a compact fluorescent lamp), then other methods can be used to code using half cycles of the power waveform. For example, reference is made to FIG. 12, which is a simple block diagram corresponding to FIG. 2, and in which corresponding reference numerals indicate corresponding parts. FIG. 12 differs from FIG. 2 only in that capacitors $C_{100}$, $C_{101}$ have been placed across the outputs of bridges $BR_1$, $BR_2$ and are switchable in and out of the circuit by electronic switches $SW_{100}$, $SW_{101}$ (which can be operated by a microcontroller, not shown, to switch the capacitors into the circuit for a brief portion of each cycle or half cycle at any selected time). If the capacitors $C_{100}$, $C_{101}$ are sufficiently large relative to the load, then they will affect the shape of the waveform (acting in effect as filter capacitors), but without substantially affecting the RMS value of the signal, and therefore without affecting the operation of the lamp or other load. The change in waveform can be detected by any conventional arrangement and can be used as additional information, e.g. to control a single load in the manner previously described, or to determine what load to control if power is being supplied through the dimmer or control device to more than one load. It is of course important in all cases, and particularly in the circuit shown in FIG. 12, to ensure that the total harmonic distortion (in the transmitted AC waveform) does not exceed a selected limit, preferably 20% and more preferably 10%. In addition, the method used for signalling should not reduce the power factor of the transmitted waveform (at terminals $AC_3$, $A_4$) below 90% as compared with the power factor of the input waveform (at terminals $AC_1$, $AC_2$). Further, it is important that high frequency components not be used for signalling (e.g. no frequency components above about 100 KHz). However, desirably, each half cycle of the signal is left substantially unchanged in shape (or is changed such that total harmonic distortion as mentioned is less than about 20%, preferably less than 10%), but the arrangement of the half cycles of the power signal is used for signalling (e.g. full wave positively or negatively rectified as shown in FIG. 3, or coded as shown in FIG. 10). This arrangement does not affect the power factor, does not introduce any harmonic distortion, does not change the RMS value of the power signal, does not require any additional wiring, and is relatively simple to use in practice.

Figure 13:
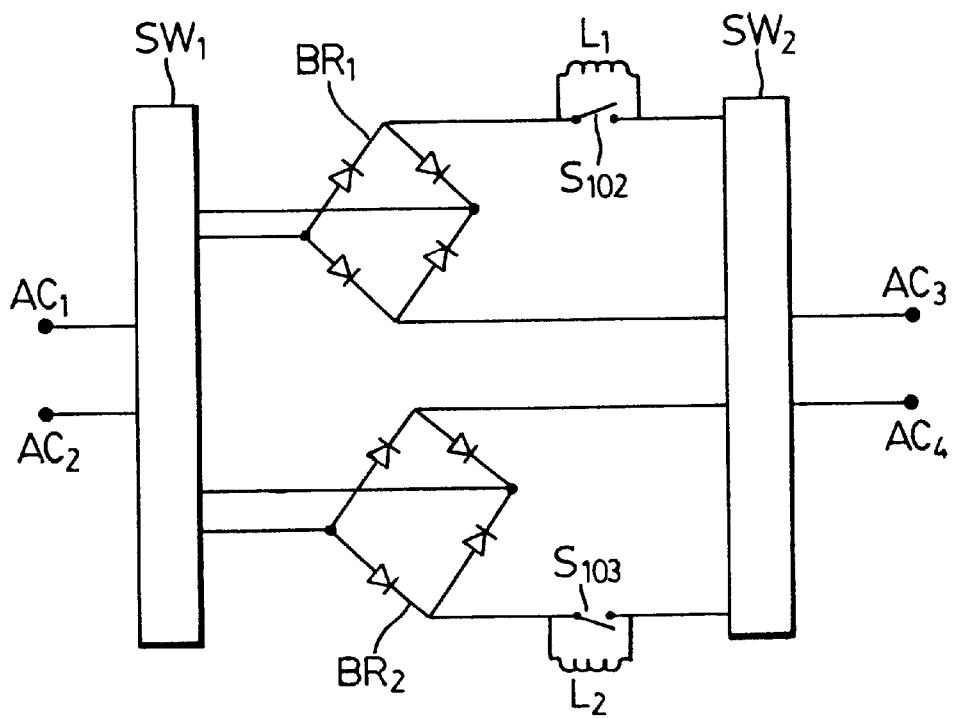
FIG. 13 shows a still further modification of the dimmer switch and rectifying stage of FIG. 2.

If desired, instead of using the capacitors shown in FIG. 12, inductors $L_1$, $L_2$ can be used as shown in FIG. 13 to change the waveform to a limited extent to introduce additional signalling capabilities. Again, switches $S_{102}$, $S_{103}$ are electronically controlled to switch the inductors in and out of each half cycle as desired, for an appropriate length of time, so as to change the waveform sufficiently for detection but not so much as to introduce more than the amount of harmonic distortion referred to above. Again, the FIG. 13 arrangement will be used only where the values of inductors $L_1$, $L_2$ can be relatively large relative to the load.

In addition to providing dimming control for lighting ballasts and lamps, the present invention may also be used to control general household devices containing a front-end full wave bridge rectifier, such as burglar alarms, smoke alarms, and some heaters, air conditioning units, refrigerators, etc. As previously discussed, the devices controlled are either essentially resistive loads or have an internal bridge rectifier to full wave rectify the AC waveform. Since this internal bridge rectifier will also rectify a full wave positively rectified AC signal or a full wave negatively rectified AC signal into a full wave (usually positively) rectified AC signal, it is of no consequence to provide such a device with a full wave positively or negatively rectified AC signal or coded AC signal in place of AC source 20.

In this way, such household devices can be controlled by a device interface comprising any logic circuit which can differentiate between the signals described and which controls the device accordingly. Control of such devices may be achieved using a stand-alone computer or other remote control device connected to a wall outlet and does not require the installation of special switches or the running of separate communication wires to the device.

Since dimmer 10 may not be directly employed with AC devices that utilize transformers (a similar restriction exists for traditional dimming circuits), it is desirable to install a simple conventional electrical fuse circuit at the input of such devices. This fuse circuit will check the impedance of the device in a conventional manner and will disable the dimmer 10 if the impedance is low (i.e. if a transformer is sensed).

Finally, although the preferred embodiment has been described in connection with a two phase 60 Hz power line, the principle of the present invention can be applied to multiple-phase configurations, e.g. three phase configurations.

As will be apparent to persons skilled in the art, various modifications and adaptations of the structure described above are possible without departure from the present invention, the scope of which is defined in the appended claims.

I claim:

1. A control circuit for controlling an electrical load having a load input, said control circuit comprising:
   (a) a power input for receiving an input AC waveform having a selected RMS value,
   (b) a rectifying circuit coupled to said input for producing at a power output one of a plurality of output waveforms from said AC input waveform, each output waveform having an RMS value substantially the same as said selected RMS value,
   (c) a controller coupled to said rectifying circuit and operative to cause said rectifying circuit to produce at said power output a selected one of said output waveforms,
   (d) said load input being adapted to be coupled to said power output for receiving said selected output waveform so that said selected output waveform provides power to said load,
   (e) and a decoder control circuit adapted to be coupled to said power output and to said load and responsive to the selected output waveform from said rectifying circuit for controlling said load.

2. A control circuit according to claim 1 wherein said output waveforms include at least some positive half cycles of said input waveform and at least some negative half cycles of said input waveform.

3. A control circuit according to claim 1 wherein said output waveforms include said input waveform, said input waveform full wave positively rectified, and said input waveform full wave negatively rectified.

4. A control circuit according to claim 1 wherein said output waveforms include a plurality of half cycles of said input waveform positively rectified and a plurality of half cycles of said input waveforms negatively rectified, the sequence of positive and negative half cycles in said output waveform comprising a code.

5. A control circuit according to claim 3 wherein said output waveforms include a plurality of half cycles of said input waveform positively rectified and a plurality of half cycles of said input waveforms negatively rectified, the sequence of positive and negative half cycles in said output waveform comprising a code.

6. A control circuit according to claim 4 or 5 wherein said sequence comprises at least two sequential positive half cycles separated from the remainder of said sequences by at least one negative half cycle, and two sequential negative half cycles separated from the remainder of said sequences by at least one positive half cycle.

7. A control circuit according to any of claims 1 to 5 wherein each of said output waveforms has total harmonic distortion of less than or equal to 20%.

8. A control circuit according to any of claims 1 to 5 wherein the power factor of each of said output waveforms differs from the power factor of said input waveform by less than 10%.

9. A control circuit according to claim 1 wherein said rectifying circuit comprises a full wave bridge.

10. A control circuit according to claim 9 wherein said rectifying circuit includes a switch circuit responsive to said controller for selectively coupling said power input to said power output, or for connecting said bridge between said power input and said power output to provide a first output waveform which comprises said input waveform positively rectified, or for connecting said bridge between said input and output to provide a second output waveform which comprises said input waveform negatively rectified.

11. A control circuit according to claim 10 wherein said first output waveform is full wave positively rectified and said second output waveform is full wave negatively rectified.

12. A control circuit according to claim 11 wherein said switch circuit comprises at least one manually operated switch coupled to said controller for controlling said switch circuit so that said input waveform is normally connected to said power output or is normally disconnected from said output, and for momentarily connecting either said full wave positively or said full wave negatively rectified waveform to said power output.

13. A control circuit according to claim 10 wherein said controller includes a microcontroller coupled to said bridge and to said switch circuit for controlling the sequence and polarity of the half cycles of the output waveform at said power output.

14. A control circuit according to claim 9 wherein said rectifying circuit comprises two full wave bridges, and a switching circuit responsive to said controller for connecting one or the other of said full wave bridges between said power input and said power output.

15. A control circuit according to claim 1 wherein said load is an electrical light.

16. A control circuit according to claim 15 wherein said light is a resistance device.

17. A control circuit according to claim 15 wherein said light is a gas discharge device.

18. A control circuit according to claim 1 wherein said decoder control circuit includes a decoder coupled to said power output for decoding the output waveforms at said power output, for producing a decoder signal, and a load control circuit coupled to said decoder and to said load and responsive to said decoder signal for controlling said load.

19. A control circuit according to claim 18 wherein said load control circuit includes a lead for applying power to said load.

20. A control circuit according to claim 18 wherein said load is connected to said power output and includes a further control circuit connected to said load control circuit and responsive to the operation thereof for controlling said load.

21. A method of controlling an electrical load at a first location connected by power wires to an AC source at a second location, said AC source providing an AC waveform having a selected RMS value, said method comprising:

(a) controlling said AC waveform at said second location to produce a set of power waveforms each having an RMS value substantially equal to said selected RMS value, (b) selectively transmitting one of said set of power waveforms from said second location over said power wires to said electrical load to provide power to said load, (c) at said first location, decoding said power waveforms and controlling said electrical device in accordance therewith.

22. A method according to claim 21 wherein said set of power waveforms comprises a first power waveform consisting of said AC waveform, a second power waveform consisting of the absence of said AC waveform, a third power waveform comprising at least a portion of said AC waveform rectified positively, and a fourth power waveform comprising at least a portion of said AC waveform rectified negatively.

23. A method according to claim 22, wherein said electrical load is a lamp.

24. A method according to claim 23, including using said third and fourth power waveforms to increase and decrease the brightness of said lamp.

25. A method according to claim 21 including providing a dimmer circuit at said second location, said dimmer circuit including a switch, and operating said switch to provide said respective power waveforms.

26. A method according to claim 22 wherein said third and fourth power waveforms are full wave rectified.

* * * * *

UNITED STATES PATENT AND TRADEMARK OFFICE
CERTIFICATE OF CORRECTION

PATENT NO. : 6,069,457
DATED : January 20, 1998
INVENTOR(S) : Alexei Bogdan

It is certified that error appears in the above-identified patent and that said Letters Patent is hereby corrected as shown below:

On the title page, item [73]:

Assignee name "Lumion University" should be "Lumion Corporation"

Signed and Sealed this

Twenty-second Day of May, 2001

Attest:

NICHOLAS P. GODICI

Attesting Officer

Acting Director of the United States Patent and Trademark Office